United States Patent
Juhlin

(10) Patent No.: US 8,553,433 B2
(45) Date of Patent: Oct. 8, 2013

(54) DC VOLTAGE COMPENSATION IN A MULTI-TERMINAL HVDC POWER TRANSMISSION NETWORK

(75) Inventor: Lars-Erik Juhlin, Ludvika (SE)

(73) Assignee: ABB Technology AG, Zurich (CH)

( * ) Notice: Subject to any disclaimer, the term of this patent is extended or adjusted under 35 U.S.C. 154(b) by 24 days.

(21) Appl. No.: 13/262,885

(22) PCT Filed: Apr. 6, 2009

(86) PCT No.: PCT/EP2009/054103
§ 371 (c)(1),
(2), (4) Date: Oct. 4, 2011

(87) PCT Pub. No.: WO2010/115453
PCT Pub. Date: Oct. 14, 2010

(65) Prior Publication Data
US 2012/0026760 A1    Feb. 2, 2012

(51) Int. Cl.
*H02J 3/36* (2006.01)
(52) U.S. Cl.
USPC ............................................................ 363/35
(58) Field of Classification Search
USPC ............ 363/34–37, 51–55, 131, 132; 307/11, 307/18, 43, 82; 700/286–298
See application file for complete search history.

(56) References Cited

U.S. PATENT DOCUMENTS

| | | | |
|---|---|---|---|
| 4,941,079 A * | 7/1990 | Ooi | 363/132 |
| 5,867,375 A | 2/1999 | Svensson et al. | |
| 8,170,723 B2 * | 5/2012 | Berggren et al. | 700/297 |
| 2008/0103630 A1 | 5/2008 | Eckroad | |

FOREIGN PATENT DOCUMENTS

| | | |
|---|---|---|
| EP | 1 919 054 A2 | 5/2008 |
| JP | 10-304573 A | 11/1998 |
| KR | 10-2008-0039822 A | 5/2008 |

* cited by examiner

*Primary Examiner* — Adolf Berhane
*Assistant Examiner* — Yemane Mehari
(74) *Attorney, Agent, or Firm* — Birch, Stewart, Kolasch & Birch, LLP

(57) ABSTRACT

In a multi-terminal HVDC power transmission network comprising at least three HVDC converter stations interconnected by at least two transmission lines, where at least one of the transmission lines is a long line, an active voltage source device is series connected to one of the transmission lines, which maintains the DC voltage of the transmission lines of the network to be within a predefined voltage range by injecting an additional DC voltage in series with the one transmission line.

26 Claims, 5 Drawing Sheets

Figure 3:
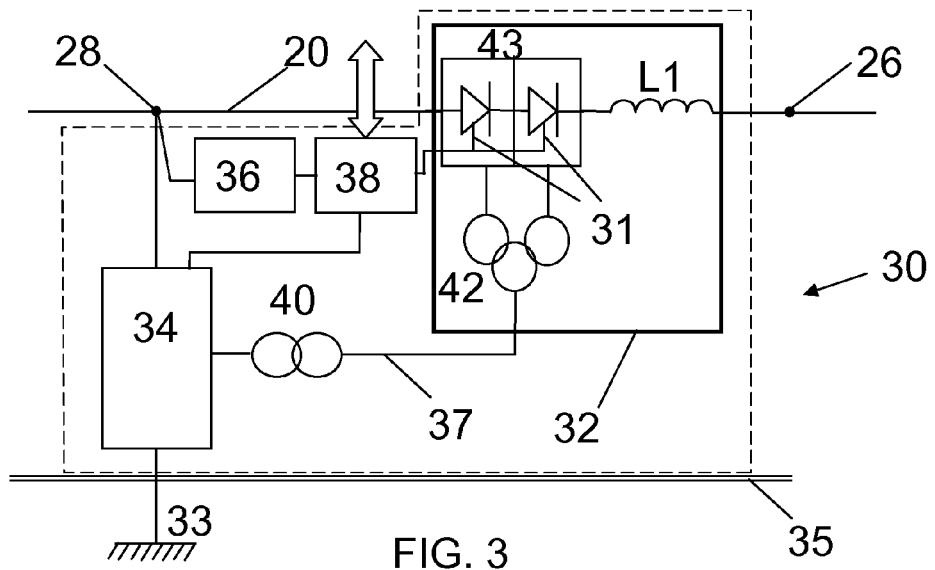

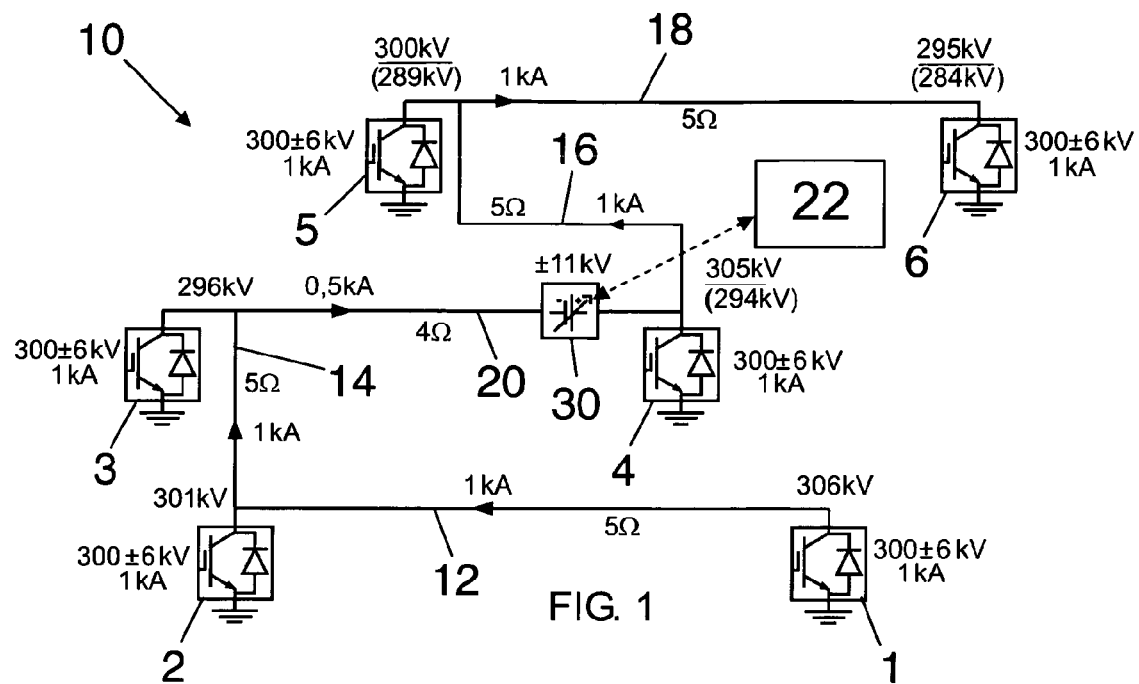
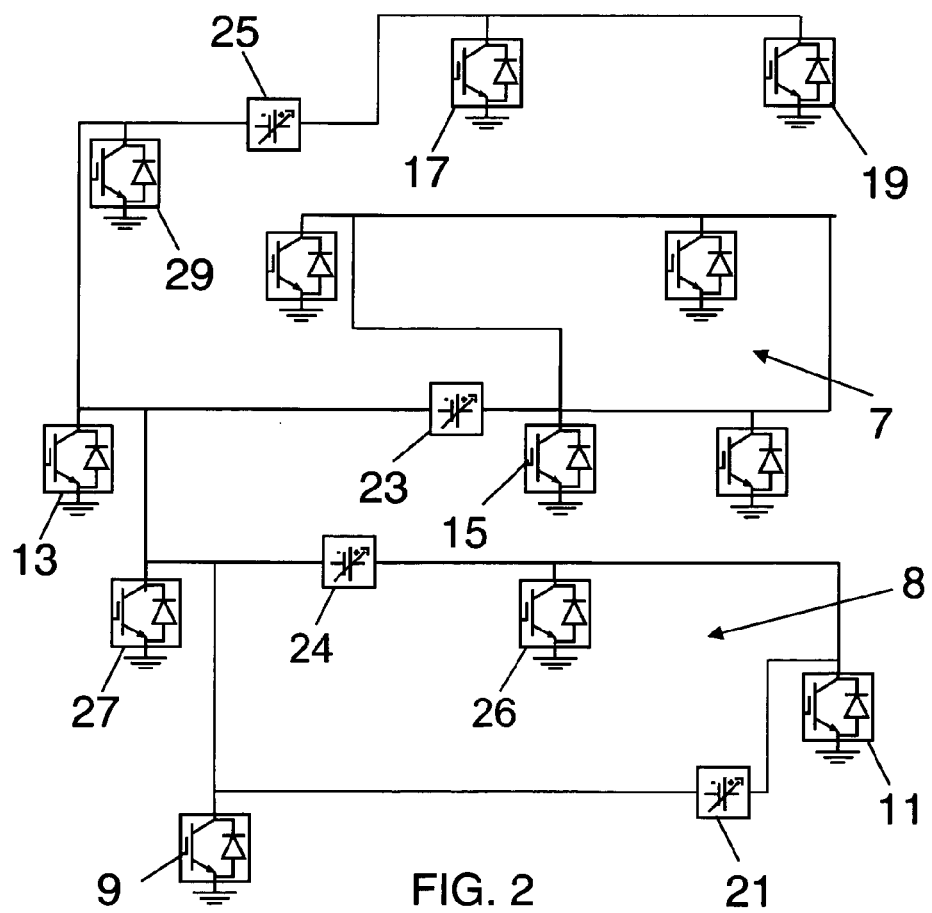

DC VOLTAGE COMPENSATION IN A MULTI-TERMINAL HVDC POWER TRANSMISSION NETWORK

The invention is related to a multi-terminal HVDC power transmission network comprising at least three HVDC converter stations interconnected by at least two transmission lines, where at least one of the transmission lines is a long line. The invention further relates to a method to operate such a network and to an active voltage source device.

HVDC (High Voltage Direct Current) power transmission is typically used when there is a need to transfer power over long distances, since the higher cost for the HVDC equipment is compensated at long distances by the reduced losses compared to AC power transmission. Long distance or long line in the following is to be understood as a distance of approximately or more than 500 km.

In the art, mostly point-to-point or two-terminal HVDC links are known, i.e. HVDC transmission systems comprising two power converter stations, one at each end of a power transmission line. The power transmission lines are usually either monopolar lines or bipolar lines, comprising a first pole located at a high DC voltage of several hundred up to more than a thousand kV and a second pole for the return current which is connected to ground or to a high DC voltage of opposite polarity, respectively. Few so called multi-terminal HVDC power transmission systems or networks exist in reality as well, which comprise more than just two converter stations and more than just one transmission line. A good example is the HVDC transmission network between Québec, Canada, and New England, USA, which was the first large scale mutiterminal HVDC transmission network in the world. This network comprises today three converter stations interconnected in a serial manner via two power transmission lines and covers a line distance of 1480 km. The linear interconnection of the converter stations can also be referred to as unmeshed network, in contrast with a meshed network comprising interconnected closed loops or a partly meshed network comprising interconnected regional closed loops as well as linear interconnections between the regions and/or linear interconnections reaching out to further distant regions.

In the future, more and partly even larger HVDC transmission networks are expected to be built, which might cover even longer distances and/or areas and which could be used for example to transfer power between different continents. Such large HVDC transmission networks could be built from scratch, but could also be a result of newly added links between existing smaller HVDC transmission networks. For example, it is suggested in "Viability of a national HVDC Transmission Ring in India", by Mata Prasad et al, presented at Cigré Symposium, September 1999, Kuala Lumpur, Malaysia, that existing and future HVDC transmission networks in India as well as back-to-back HVDC links could be integrated in a so called HVDC ring scheme, which would in fact form a partly meshed HVDC network comprising a closed loop and a linear interconnection. In the article it is pointed out that implementation and operation of such an enlarged HVDC transmission network requires considering specific issues in connection with a required hierarchical formulation of control algorithms, such as a co-ordination between the HVDC links constituting the network, ensuring an optimal power flow in the lines of each region of the network and stabilizing the grid in a region-wise manner.

Other documents dealing with multi-terminal HVDC networks focus mainly on the reliability and availability of the network, especially in case of line faults, such as in "Multi-terminal HVDC for High Power Transmission in Europe" by Michael Häusler, presented at the Central European Power Exhibition and Conference (CEPEX), March 1999, Poznan, Poland; or as in "Challenges with Multi-Terminal UHVDC Transmissions" by Victor F. Lescale et. al, presented at IEEE Power India Conference (POWERCON), 12-15 Oct. 2008, New Delhi, India.

It is an object of the invention to propose a solution with which the transfer of a desired amount of power over a multi-terminal HVDC network of the kind explained above can be ensured.

This object is achieved by a multi-terminal HVDC power transmission network according to claim 1, a method to control such a network according to claim 6 and an active voltage source device according to claim 11.

The invention is based on the recognition of the fact that the length of transmission line or lines necessary for future multi-terminal HVDC networks are likely to reach dimensions where the voltage drop along the line(s) can not be overcome by countermeasures known for two-terminal HVDC links. For multi-terminal HVDC networks, this issue has up to now not been addressed at all. It was further recognized that for large, multi-terminal HVDC networks, VSCs (Voltage Source Converters) in the converter stations are more likely to be used than LCCs (Line Commutated Converters), since VSCs always work with the same DC voltage level, independently of the direction of power flow. A drawback of VSCs compared with LCCs is on the other hand their reduced freedom to control the DC voltage, something which impairs the chances to compensate for the voltage drop in the network.

Assuming for example that power is to be transmitted at a DC voltage of ±500 kV from the Sahara to northern Europe via a linear interconnection of several HVDC transmission links. The overall line length becomes several thousand kilometers, where the lines of each transmission link in the network may have individual lengths of several hundred up to about a thousand kilometers. A voltage drop across a line of the length of 1000 km can well be in the order of 50 kV in case of an overhead line, i.e. in the order of 10% of the total voltage here.

It is known today, when transmitting power over a long distance via a two-terminal HVDC link, to overcome the voltage drop problem by rating the HVDC converter station which works as a rectifier for a higher voltage than the HVDC converter station on the other end of the link which works as an inverter.

The inventor now realized that the use of differently rated HVDC converter stations is not an option for a multi-terminal HVDC network, as the voltage variation at different power flows would become difficult or even impossible to handle, especially in case of VSC-based converter stations. It was further realized that it would be advantageous if all converter stations in a multi-terminal HVDC network could have the same voltage rating, since the reduced variety of components in the system would reduce the effort and cost for design, manufacturing, implementation, operation and controlling as well as maintaining the system. Even further, the inventor realized that in a multi-terminal HVDC network comprising a linear interconnection, each line in the linear interconnection adds to the overall voltage drop, so that in the example above the DC voltage level in the southern part of the HVDC network, close to the Sahara, would be significantly higher than in northern Europe. Accordingly, the northern voltage level would certainly fall outside any tolerance range for voltage variations acceptable by a converter station, and it would lead to a drastically reduced amount of power transferrable in the northern part of the network, especially in the case of a reverse of the power flow direction. On possiblity would of course be to design and install converter stations which tolerate larger voltage variations, but this would increase the costs considerably.

In order to overcome the problem with the unacceptable voltage drop, it is suggested according to the invention to add to a multi-terminal HVDC network an active voltage source device in series connection to one of its transmission lines and to control the active voltage source device to inject an additional DC voltage in series with the one transmission line in such a way that the DC voltage level of the transmission lines of the network is kept within a predefined voltage range. As the voltage level in the network is maintained at or around a desired level, the transmission of a desired amount of power in the whole network can thereby be ensured and the converter stations in each terminal of the multi-terminal network can have the same and thereby a standardized voltage rating and can be designed for moderate voltage tolerances. Due to the invention, a multi-terminal HVDC network of any possible size can be established since the voltage drop would no longer be a limiting criterion. The voltage source device needs to be an active or actively controlled device since voltage drop compensation by a passive device would require a device with negative resistance, which does not exist. A further advantage of the invention is the effect that, by compensating for the voltage drop on the transmission line, the DC current level is reduced for the same power flow. This implies that less heat is generated in the transmission line, thereby reducing the risk of a possible earth fault. It has happened in several cases around the world, that a heavily loaded overhead transmission line increased its length as a result of the generated heat to such an extent that it sagged considerably and made physical contact with an earthed object, as for example a plant growing underneath it. The resulting earth fault was then the starting point for the development of a larger black out. The likelihood for such a situation to occur can be decreased for long DC transmission lines due to the present invention.

In an embodiment of the invention, the voltage source device injects a positive additional DC voltage in case a DC voltage level in the multi-terminal HVDC network falls below a lower DC voltage limit of the predetermined voltage range. Accordingly, the voltage source device is controlled to compensate for a voltage drop occuring on the one transmission line it is directly connected to but also to compensate for voltage drops occuring in neighbouring transmission lines, i.e. in transmission lines directly or indirectly connected to the one transmission line, which are at least so close to the one transmission line that the DC voltage level on that one transmission line affects their DC voltage level to a noticeable degree as well. As a result, the voltage level in several transmission lines can be adjusted via only one voltage source device.

In a further embodiment, the voltage source device injects a negative additional DC voltage in case a DC voltage level in the network exceeds an upper DC voltage limit. According to this embodiment, the active voltage source device is able to inject both, a positive or a negative additional DC voltage, depending on the actual situation, since it is not only advantageous to compensate for a voltage drop, but also to react to an undesired voltage rise as well, which can for example occur in case of a fast load drop on the network.

In a special development of the latter two embodiments, central control unit in the network determines the magnitude and sign of the additional DC voltage in dependence on the DC voltage levels in the HVDC converter stations of the network and on the DC current levels of the at least two transmission lines. From those DC voltage and DC current levels, the central control unit gets an overview of the status and behaviour of the whole network and it can accordingly decide, if and where in the network a voltage drop or a voltage rise need to be compensated. The central control unit then determines the appropriate magnitude and sign of the additional DC voltage and sends this information to the voltage source device in order to initiate it to inject the additonal DC voltage accordingly.

In case of a network comprising closed loops, i.e. in a partly or fully meshed network, the central control unit determines the magnitude and sign of the additional DC voltage not only so that the voltage source device maintains the DC voltage levels of the transmission lines within the predefined voltage range but also so that it balances the DC current distribution in a closed loop in the network. This embodiment is based on the recognition of the fact that in a meshed HVDC network with at least one closed loop, it is possible to take advantage of the availability of at least two possible ways for the power flow in order to relieve those transmission lines which carry a very high current or even a current close to triggering an overcurrent protection function and/or device. By balancing the power flow, i.e. by distributing the current flow in the meshed HVDC network as evenly as possible by rerouting the current through parallel connections so that heavily loaded lines are relieved, the power transmission capacity of the network is optimally used, unnecessary intervention of overcurrent protection devices is avoided and overload conditions, as the above described undesired lengthening of the lines, are avoided.

In a further embodiment of the invention, the voltage source device is power supplied from an external power source. In another, advantageous embodiment, the voltage source device receives its power from the transmission line it is connected to, so that an external power supply is no longer necessary. This embodiment allows the location of the voltage source device even in remote areas with no or only reduced infrastructure.

In a further embodiment, more than one voltage source device is connected to the network, and the voltage source devices are controlled in a coordinated manner by the central control unit in order to together maintain the DC voltage of the transmission lines of the network to be within a predefined voltage range and, in cases of a partly or fully meshed network, to also balance the DC current distribution in one or more closed loops in the network. Preferably, not each of the transmission lines is provided with its own voltage source device, but instead the DC voltage level of several transmission lines is adjusted via one voltage source device, which saves costs and installation and maintenance efforts. But it is also possible that, especially in case of very long transmission lines, each transmission line is connected to one or even more corresponding voltage source devices.

By using as many voltage source devices as necessary and distributing them over the network so that the voltage variations in the network can be compensated for in each and every transmission line, it is ensured that the same standardized DC voltage can be used in the whole network, independently of the size and topology of the network, of the actual power flow direction and of the load distribution in the network.

Figure 4:
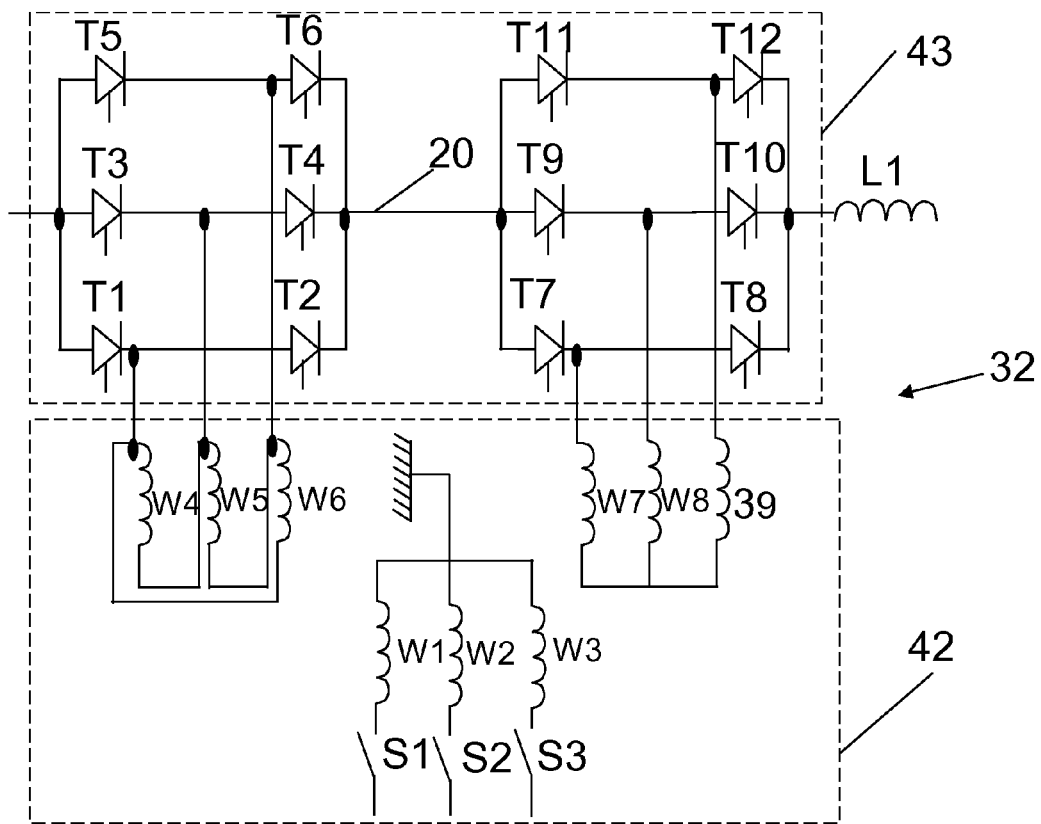
Figure 5:
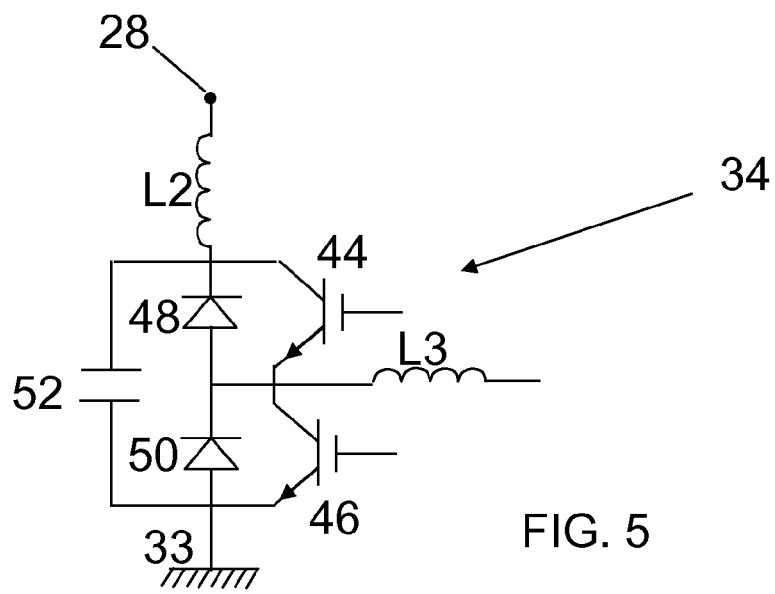
Figure 6:
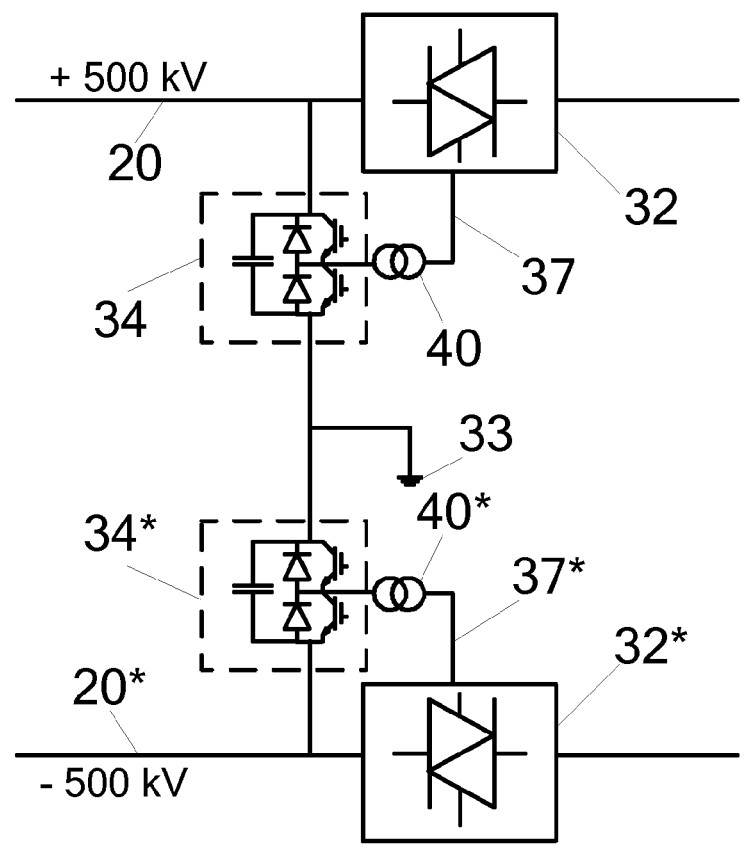
Figure 7:
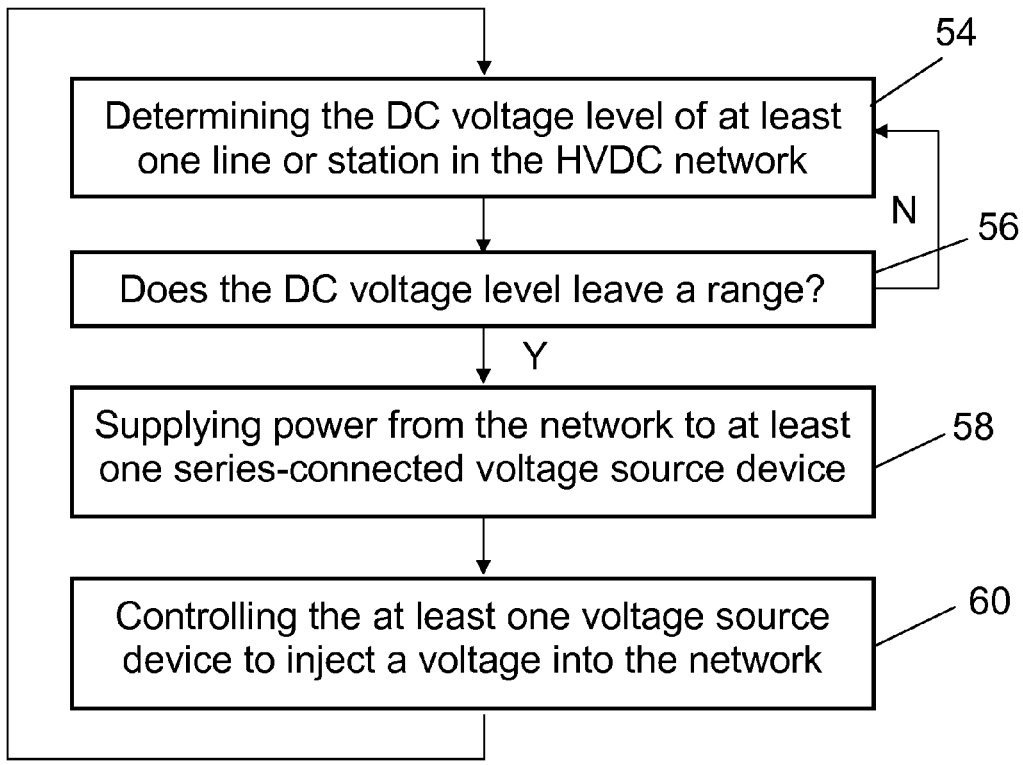
Figure 8:
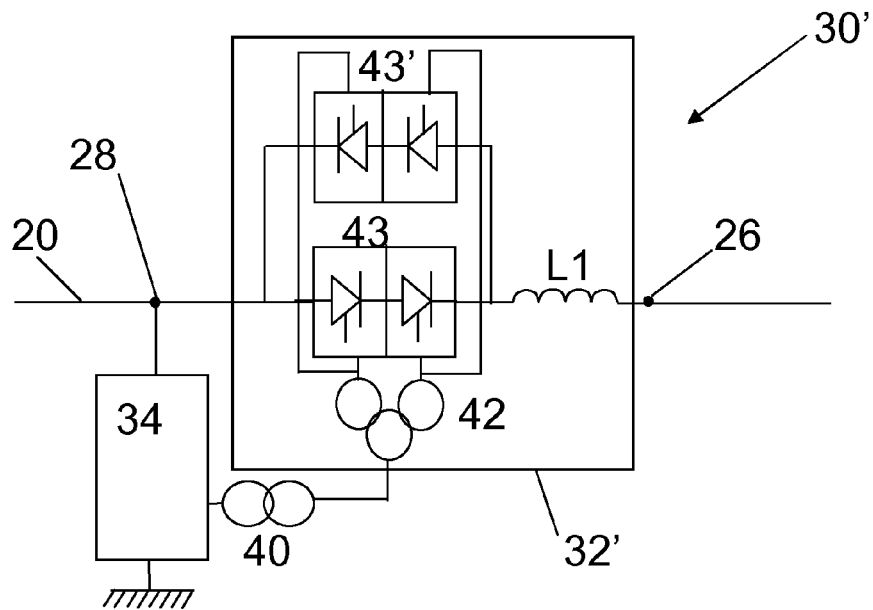
Figure 9:
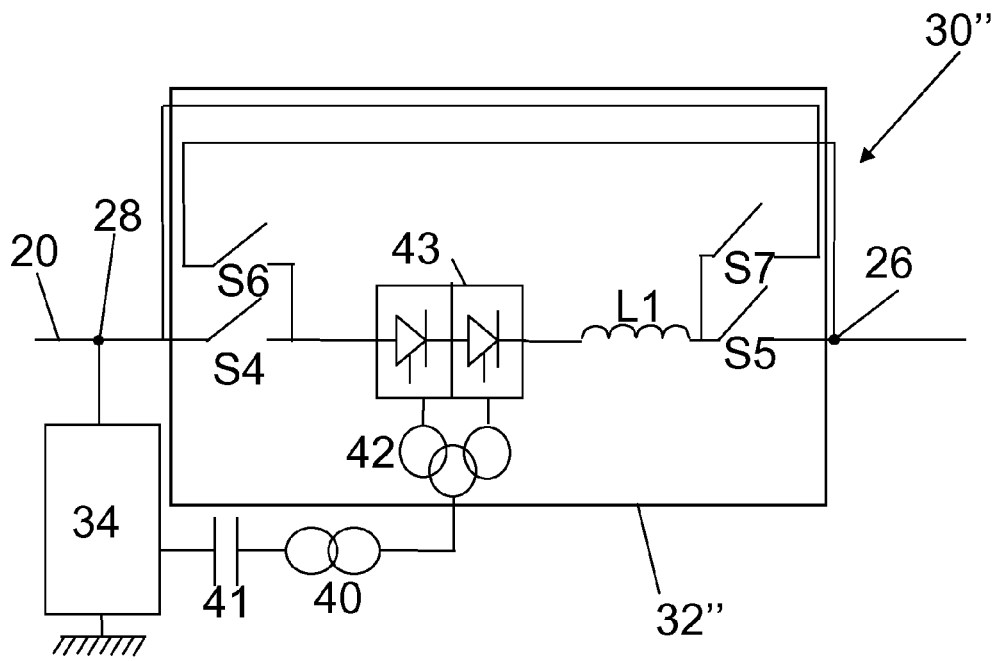
Figure 10:
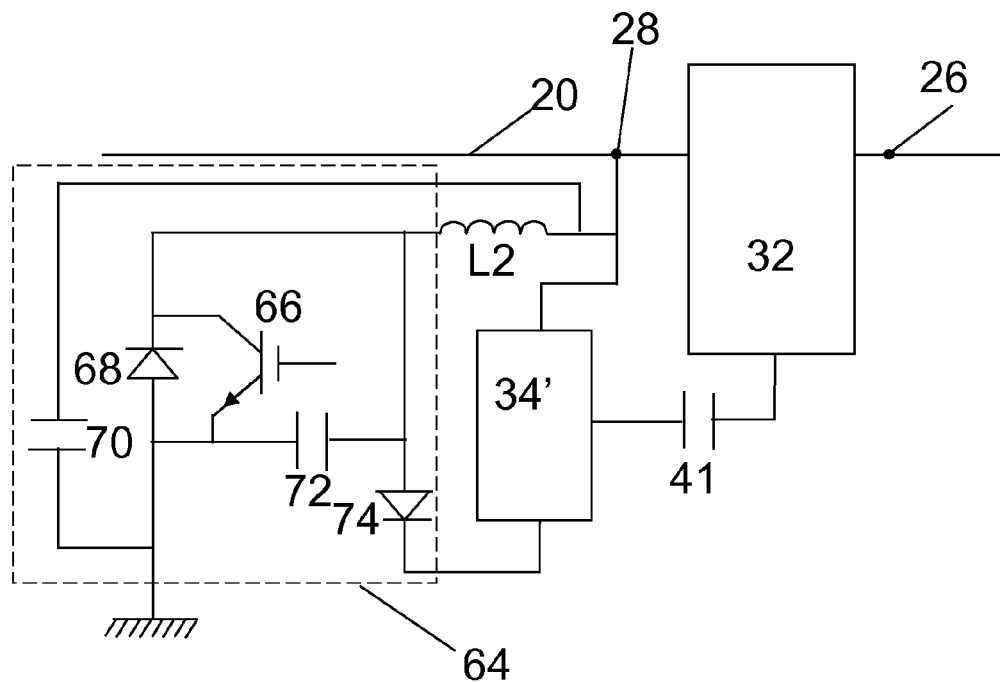

Other features and advantages as well as further embodiments of the present invention will become more apparent to a person skilled in the art from the following detailed description in conjunction with the appended drawings, in which:

FIG. 1 shows a multi-terminal HVDC power transmission network according to the invention and in form of a linear interconnection, FIG. 2 shows a multi-terminal HVDC power transmission network according to the invention and in form of a partly meshed network, FIG. 3 shows a first embodiment of a voltage source device for a monopolar transmission line, FIG. 4 shows the first converter of the voltage source device of FIG. 3 in detail, FIG. 5 shows the second converter of the voltage source device of FIG. 3 in detail, FIG. 6 shows the first embodiment of a voltage source device for a bipolar transmission line, FIG. 7 shows the steps of a method to compensate a voltage drop or voltage rise in a multi-terminal HVDC power transmission network, FIG. 8 shows a second embodiment of a voltage source device for a monopolar transmission line, FIG. 9 shows a third embodiment of a voltage source device for a monopolar transmission line, FIG. 10 shows a fourth embodiment of a voltage source device for a monopolar transmission line.

FIG. 1 shows a multi-terminal HVDC power transmission network 10 in the form of an unmeshed network and specifically in the form of a linear interconnection.

Suppose that at first three two-terminal HVDC links existed and were operated independently of each other, were the first HVDC link comprises converter stations 1 and 2 interconnected by transmission line 12, the second HVDC link comprises converter stations 3 and 4 interconnected by transmission line 20 and the third HVDC link comprises converter stations 5 and 6 interconnected by transmission line 18. Afterwards, the first and second HVDC links were connected by introducing a transmission line 14 between converter stations 2 and 3, and the second and third HVDC links were connected by introducing a transmission line 16 between converter stations 4 and 5. The results was a long, linear interconnection between converter stations 1 and 6. All converter stations have the same voltage rating, which in this example is 300 kV with a tolerance range of ±6 kV. The power flow directs from the converter station 1 to the converter station 6, as is indicated by the arrows for the current direction. Between converter stations 3 and 4, an active voltage source device 30 is series connected to transmission line 20, which has the capability to compensate for a voltage variation of ±11 kV maximum. The voltage source device 30 receives its power from transmission line 20. The orientation of the voltage source device 30 is signified by the plus and minus signs in the four-quadrant diagram depicted on the symbol for the voltage source device 30, which indicate that a positive voltage is injected from left to right, i.e. in the same direction as the current flows on transmission line 20 in FIG. 1. The orientation signifies the polarity of the voltage generated and injected by the DC power flow control device 30 in case of a positive additional DC voltage. A central control unit 22 is shown schematically, which monitors and controls the whole network 10 and which therefor communicates not only with the voltage source device 30, as is indicated by the dashed double arrow, but also with all the converter stations 1 to 6, which is not specifically shown in FIG. 1 due to reason of simplicity.

At each converter station in the HVDC network 10, the local voltage level is shown, where for the converter stations 4, 5 and 6, which are located after the voltage source device 30 in the direction of the power flow, two different voltage levels are indicated, the upper underlined value being the value for an operation of HVDC network 10 with voltage source device 30 and the lower bracketed value being the value for an operation of HVDC network 10 without voltage source device 30. It is apparent, that for the first three converter stations, i.e. converter stations 1, 2 and 3, the local voltage level lies within their tolerable voltage range of 300 kV±6 kV, independently of the presence of the voltage source device, which is due to the power flow direction away from them. But for converter stations 4, 5 and 6, the tolerable voltage range would almost or in fact, respectively, be exceeded if no voltage source device 30 was present. The difference between the acceptable, lower voltage limit of 294 kV and the local voltage levels would be 0 kV, 5 kV and 10 kV, respectively. By introducing the voltage source device 30 at the suitable point between converter stations 3 and 4 and designing it to compensate for a voltage variation of ±11 kV maximum, it becomes possible to compensate even for the biggest voltage drop at converter station 6 in a way, that all local voltage levels end up lying within the voltage range of 300 kV±6 kV. As a result, all converter stations in the HVDC network 10 can be used without any modifications, i.e. they can keep their standardized and moderate voltage rating even though they are now interconnected in a larger network than they were before.

A method to control a multi-terminal HVDC power transmission network is schematically depicted in FIG. 7. The method is performed by an interaction of the central control unit 22 with a control unit integrated in the voltage source device 30 and maybe also with measurement equipment installed in the converter stations 1 to 6. In a first step 54, the DC voltage level of at least one line or at least one converter station connected to the at least one line in the HVDC network is determined, where the at least one line is a line known or expected to be critical with respect to the possible exceeding of an acceptable tolerance range for a voltage variation on the line. In the example of FIG. 1, it is assumed that stable load conditions exist, i.e. that no voltage rise occurs and only the voltage drop needs to be looked at. It would be decided due to the actual power flow direction, that the voltage drop of lines 20, 16 and 18 would be of interest and accordingly, at least one of the corresponding voltage drops would be determined, which is this example is the DC voltage level of converter station 5. In second step 56, it is decided whether the determined DC voltage level leaves the predetermined voltage range, i.e. the central control unit compares in step 56 the determined DC voltage level with the upper and lower DC voltage limits of the predetermined voltage range, which in the example of FIG. 1 is 306 kV for the upper DC voltage limit and 294 kV for the lower DC voltage limit. If the DC voltage level stays inside the predetermined voltage range, the method returns to step 54, i.e. the monitoring of the at least one DC voltage level is continued. In the example of FIG. 1, the DC voltage level of converter station 5 of 289 kV means that the measured voltage falls below the lower DC voltage limit of 294 kV by 5 kV. In such a case, the central control unit 22 initiates the voltage source device 30 to tap power from transmission line 20 (step 58) and to inject a positive additional DC voltage in series with transmission line 20. (step 60). To achieve that, the central control unit 22 determines the magnitude and sign of the additional DC voltage, which in the example of FIG. 1 would be a magnitude of 11 kV to compensate fully for the voltage drop in converter station 5 and a positive sign, and it transmits these two values to the voltage source device 30, which then starts to tap power. In an alternative solution, the central control unit could also determine a magnitude to just partly compensate for the voltage drop in converter station 5, by taking into account further criteria, such as the load situation on the network.

In FIG. 2, an example for another possible HVDC network topology different from FIG. 1 is shown, in order to illustrate how multiple voltage source devices could be used to compensate for the voltage drop or voltage rise in a partly meshed network. The network comprises two closed loops 7 and 8, each comprising four converter stations. The two closed loops 7 and 8 are interconnected via a first linear interconnection between the converter stations 27 and 15. A second linear interconnection is used to transmit power from converter station 13 up to a remote converter station 19. It is assumed, that both the first and the second linear interconnections suffer from a considerable voltage drop due to their length. Accordingly, a first voltage source device 23 is series connected to the transmission line between converter stations 13 and 15 in order to compensate for the voltage drop in the first linear interconnection, which could also affect one of the closed loops 7 or 8, depending on the power flow direction. A second voltage source device 25 is series connected to the transmission line between converter stations 29 and 17 in order to compensate for the voltage drop in the second linear interconnection. In addition, the long length of the transmission line between converter stations 9 and 11 in the closed loop 8 requires a third voltage source device 21 to be series connected in that line. Even further, a fourth voltage source device 24 is introduced in the same closed loop 8 between converter stations 27 and 26. With the third and the fourth voltage source devices 21 and 24 it becomes possible to perform two functions at once: to compensate for a voltage drop or a voltage rise and to balance the DC current distribution in closed loop 8. All four voltage source devices are power fed from the transmission lines they are connected to and all of them are able to not only compensate for voltage drops but to react on voltage rises as well.

How such a line fed voltage source device could be implemented will be explained with the various embodiments described in the following.

A first embodiment of a voltage source device 30 is schematically shown in FIG. 3. The voltage source device 30 is series connected to transmission line 20 (see FIG. 1) and is depicted as a dashed box. The voltage source device 30 is more particularly connected to the transmission line 20 between a so called voltage injection point 26 and a power tapping point 28. Transmission line 20 is located at a high DC voltage level, which is here nominal 300 kV, and is in the example of FIG. 3 a monopolar transmission line. As is indicated by a double line, the voltage source device 30 is mounted on an insulated platform 35. This platform 35 is preferably connected to the same voltage level as transmission line 20, i.e. to 300 kV.

The voltage source device 30 includes a first converter 32, which here is a line commutated converter (LCC), as is for example known from the art described in Erich Uhlmann, "Power Transmission by Direct Current", Springer-Verlag Berlin-Heidelberg-New York, 1975. The first converter 32 acts as a rectifier to transform an AC voltage into a DC voltage and is thereby able to inject a DC voltage into transmission line 20 between the power tapping point 28 and the voltage injection point 26, i.e. in series with the line and oriented from power tapping point 28 to voltage injection point 26. so that the voltage level in transmission line 20 and indirectly in all other lines 12, 14, 16 and 18 of HVDC network 10 is adjusted. The first converter 32 in turn includes a first transformer 42, a first set 43 of current valves and a first inductor L1. The current valves in this first set 43 each have control terminals 31 and are provided in series with each other and in series with the transmission line 20 between the voltage injection point 26 and the power tapping point 28, where the valves are connected directly to the power tapping point 28 and indirectly via the series connected first inductor L1 to the voltage injection point 26. The current valves have an orientation in relation to the line which allows current to run in one direction in the line while stopping current from running in the opposite direction. The first set 43 of current valves is furthermore divided into sections, where one first section is connected to a first winding or a first set of phase windings of the first transformer 42 and a second section is connected to a second winding or a second set of phase windings of the first transformer 42, where the first transformer 42 is a three-phase three-winding transformer. Each section here provides one part of the voltage to be injected into transmission line 20 by the first converter 32.

FIG. 4 shows a possible realization of the first converter 32 in further detail. The first transformer 42 of the LCC converter is a three-phase three-winding transformer, which has a third set of phase windings W1, W2 and W3 being magnetically connected to a first set of Delta-interconnected phase windings W4, W5 and W6 as well as to a second set of Y-interconnected phase windings W7, W8 and W9. A first end of each phase winding W1, W2 and W3 in the third set is connected to a second transformer 40 (see FIG. 2) via a respective switch S1, S2 and S3, while a second end of these windings W1, W2 and W3 are jointly connected to local ground on the platform 35.

A first section of the first set 43 of current valves of the first converter 32 includes six current valves, here in the form of thyristors, where a first and a second current valve T1 and T2 are connected in a first branch in series with transmission line 20, a third and a fourth valve T3 and T4 are connected in a second branch in series with transmission line 20 and a fifth and a sixth current valve T5 and T6 are connected in a third branch in series with transmission line 20. The first, second and third branches are thus connected in series with transmission line 20 and in parallel with each other. A first end of one phase winding W4 in the first set of phase windings is connected into the first branch between the first and the second current valves T1 and T2. A second end of the same phase winding W4 is connected to a first end of another phase winding W5, where the first end of this other phase winding W5 is also connected to the second branch between the third and the fourth current valves T3 and T4. A second end of the other phase winding W5 is connected to a first end of the final phase winding W6 in the first set of windings. This first end of the final phase winding W6 is also connected into the third branch between the fifth and the sixth current valves T5 and T6, while a second end of this final phase winding W6 is connected to the first end of the first mentioned phase winding W4 in the first set of phase windings, thereby providing a Delta-connection.

A second section of the first set 43 of current valves of the first converter 32 is of the same type and is provided in the same way in series with transmission line 20 as the first section, where the first and the second sections are arranged in series with each other between the power tapping point 28 and the first inductor L1. In the second section there are thus also three parallel branches with two current valves each, T7, T8 or T9, T10 or, T11, T12, respectively. A first end of each phase winding W7, W8 and W9 of the second set of windings is connected between the two current valves of a corresponding branch, while the second ends of the phase windings W7, W8, W9 of the second set of windings are connected to each other, thereby providing a Y-connection.

Referring now again to FIG. 3, the voltage source device 30 comprises besides the first converter 32 a voltage detector 36, which in this embodiment is connected to the power tapping point 28 in order to determine a DC voltage level of the DC voltage in transmission line 20. The voltage detector 36 is in turn connected to a control unit 38. The control unit 38, which may with advantage be realized through the use of a processor and associated program memory, controls the first converter 32 so that a desired additional DC voltage, the magnitude and sign of which are determined by central control unit 22, is injected in series with transmission line 20 in order to compensate for a voltage drop or voltage rise determined by voltage detector 36. For that, the control unit 38 calculates the corresponding control signals to be applied to the first set 43 of current valves. The control unit 38 emits the corresponding control signals to the control terminals 31 of the current valves. The voltage to be injected is here typically realized through suitable variation of the phase angle of the current valves. The control unit 38 is further connected to a second converter 34, the structure and function of which are explained below.

Voltage source device 30 comprises the second converter 34 which is shunt connected between the power tapping point 28 of transmission line 20 and a grounding terminal 33 and which is also controlled by control unit 38. The second converter 34 is thus provided in between the transmission line 20 and the ground, in the same way as converters 3 and 4 in FIG. 1. The second converter 34 is further connected to the second transformer 40 which itself is connected via line 37 to the third winding or the third set of phase windings of first transformer 42.

The second converter 34 in the embodiment of FIG. 3 is a voltage source converter (VSC) 34, which acts as an inverter, i.e. it converts an input DC voltage into an output AC voltage. The input DC voltage here is the voltage at the power tapping point 28 and the output AC voltage is the input voltage of transformer 40, transformed into a desired AC voltage level on line 37. Line 37 can accordingly be regarded as a local AC network arranged on platform 35, which is used as a feeding network for the first converter 32 and as an auxiliary power supply for further devices on the platform, such as a circuit breaker, where such further devices are not shown in the figures.

One possible realization of the second converter 34 is schematically shown in FIG. 5, where there are two current valves 44 and 46, here in the form of two insulated gate bipolar transistors (IGBT), connected in series, with each current valve 44 and 46 having a diode 48 and 50, respectively, in anti-parallel connection thereto. A capacitor 52 is connected in parallel with both the current valves 44 and 46, i.e. it is connected between the collector of the IGBT of the first current valve 44 and the emitter of the IGBT of the second current valve 46. A second inductor L2 is connected between the power tapping point 28 on transmission line 20 and the series connected current valves. The connection point between the current valves 44 and 46 is connected to a third inductor L3, which itself is connected to the second transformer 40 of FIG. 2. The first, second and third inductors L1, L2 and L3 indicate the presence of filters which filter high frequency harmonics.

In case the HVDC power transmission network 10 is a bipolar system, with the first pole being transmission line 20, voltage source device 30 comprises a duplicate of its basic components being used in the monopolar case (see FIG. 3), as is shown in FIG. 6. The duplicated basic components are a duplicated first converter 32*, a duplicated second converter 34*, a duplicated second transformer 40* and a duplicated local AC network, line 37*, which are connected to each other and to the second pole 20* in the same way as the original components to the first pole.

An example for how the voltage source device of the present invention may be operated will now be described with reference to the previously described FIGS. 1-5 and 7. Detector 36 may be used to continuously measure the DC voltage level of transmission line 20, according to the first method step 54 in FIG. 7. The DC voltage level is then forwarded via the control unit 38 to the central control unit 22, where the communication between the control unit 38 and the central control 22 takes place via a bi-directional communication line, which is indicated in FIG. 3 as a block double arrow. The central control unit 22 then compares the DC voltage level to the lower and upper level of the predetermined voltage range (step 56), and, in case the range is exceeded, determines the magnitude and sign of the additional DC voltage to be injected in series with transmission line 20 based on the detected status, i.e. if a voltage drop or a voltage rise need to be compensated and if in addition the DC current distribution in a closed loop needs to be balanced. The central control unit 22 then sends out the magnitude and sign of the additonal DC voltage to control unit 38, which as a reaction to that generates control signals and sends them to the second converter 34 and to the first converter 32 in order to initiate them to provide and inject the additional DC voltage into transmission line 20, respectively (steps 58 and 60). The additional DC voltage is then injected by the first converter 32 between the power tapping point 28 and the voltage injection point 26. More particularly, the provision of the additional DC voltage, according to step 58 of FIG. 7, is performed through the second converter 34 by tapping DC power from the transmission line 20 at the power tapping point 28. The tapped DC power is then converted to an intermediate AC power by the second converter 34 and the second transformer 40, which intermediate AC power is further converted by the first transformer 42 in order to apply an appropriate AC voltage to the first converter 32. The injection of the additional DC voltage into transmission line 20 is then performed by appropriate switching of the first set 43 of current valves of the first converter 32, so that the AC voltage is converted into DC voltage and that the level of the DC voltage is adjusted to the level of the desired additional DC voltage calculated by the control unit 38.

In an alternative solution, where the control unit 38 is equipped with communication means to communicate with other devices in the HVDC power transmission network 10, it would also be possible that the control unit 38 itself performs all the steps 54 to 60 alone or that the steps would be shared in another way as described above between the central control unit 22 and the control unit 38 or even between further control units.

Since the power needed for raising the voltage to the rated level was provided through tapping of the power from the power line itself, no exterior power supplies are required, which means that the voltage source device of the present invention can be provided at remote and inaccessible locations.

The design of the series connected voltage source device according to the present invention can be varied in a multitude of ways, where some will now be described.

FIG. 8 shows a second embodiment of a voltage source device 30' and FIG. 9 shows a third embodiment of a voltage source device 30", which both for the most part have the same structure as voltage source device 30 of FIG. 3 and which are designed to handle reversed current on transmission line 20. As can be seen, their first converters 32' and 32", respectively, differ from the first converter 32 of FIG. 3, while, for the purpose of simplicity, the voltage detector 36 and control unit 38 are not shown in both Figures, even though they are present in both voltage source devices 30' and 30".

In FIG. 8, the first converter 32' comprises a first set 43 of current valves and, in addition, a second set 43' of current valves, here provided in sections including branches in the same way as in the first set. This second set 43' of current valves is connected in anti-parallel with the first set 43. The second set 43' is further connected to the first transformer 42 in the same way as the first set 43 of current valves and receives the same control signals.

The first converter 32" in FIG. 9 provides essentially the same type of functionality as the first converter 32' in FIG. 8, but requires only the first set 43 of current valves. Here, the arrangement for handling reversed currents includes a group of switches S4, S5, S6 and S7 arranged to reverse the orientation of the current flowing through the current valves in the first set 43 in relation to the transmission line 20. The switches S4 and S5 are placed in series with the transmission line 20, switch S4 between the power tapping point 28 and the first set 43 of current valves and switch S5 between the first inductor L1 and the voltage injection point 26. Switch S6 is provided in a branch that stretches from a connection point between switch S4 and the first set 43 of current valves to the voltage injection point 26, while switch S7 is provided in a branch that stretches from the power tapping point 28 to a connection point between switch S5 and the first inductor L1.

When current is running from left to right in FIG. 9, switches S4 and S5 are closed while switches S6 and S7 are open. If current is running in the opposite direction, then switches S4 and S5 are open, while switches S6 and S7 are closed.

The third embodiment according to FIG. 9 differs furthermore from the first embodiment according to FIG. 3 in that a capacitor 41 is connected in series with the second transformer 40 in order to filter out any DC voltage, so that the second transformer 40 sees a pure AC voltage.

According to a fourth embodiment of a voltage source device, as shown in FIG. 10, it is possible to omit the second transformer 40. In this case, a further converter, which is a DC-DC converter 64, is used to adjust the voltage level. In this example, the second inductor L2 placed outside of the second converter 34' and is connected in shunt to the second converter 34' between the power tapping point 28 and the DC-DC converter 64. In all other respects the second converter 34' is the same as the second converter 34 in FIG. 3. The DC-DC converter 64 includes an IGBT 66 being connected with its collector to the second inductor L2 and with its emitter to ground. A diode 68 is connected in anti-parallel to the IGBT 66. A capacitor 70 is connected in a parallel branch stretching between the power tapping point 28 and ground. A further capacitor 72 is connected between the emitter of IGBT 66 and the second inductor L2. Finally, a further diode 74 is connected between the second inductor L2 and the grounding terminal of the second converter 34' and is oriented towards this grounding terminal. The DC-DC converter 64 converts the DC voltage of transmission line 20 to a lower level suitable for the voltage level to be output by the second converter 34', which therefore does not need the second transformer 40 on its output side.

Further variations and implementations of the voltage source device are possible. For example, other types of current valves may be used, such as MOSFET transistors, GTOs (Gate Turn-Off Thyristor) and mercury arc valves. The number of sections and current valves provided in the converters may furthermore be varied or the converters could be arranged as a series connection of multiple sub-converters. In addition, a parallel connected bypass switch could be provided which is closed whenever the voltage source device is not needed. It should also be realized that various protective measures may be used such as harmonics filters, circuit breakers and device disconnection switches. Apart from that, the voltage detector and the control unit need not be an integral part of the voltage source device, but may be provided as one or two separate devices instead. The multi-terminal HVDC power transmission network according to the invention may comprise either converter stations comprising VSC or converter stations comprising LCC or a combination thereof, where the invention is even more advantageous in the case of VSCs due to their inherent reduced voltage variation capabilities.

The invention claimed is:

1. A method to control a multi-terminal HVDC power transmission network comprising at least two transmission lines, wherein at least one of the transmission lines has a length of approximately or more than 500 km, wherein the DC voltage level of the transmission lines is maintained to be within a predefined voltage range by controlling an active voltage source device which is connected in series to one of the transmission lines to inject a DC voltage in series with the one of the transmission lines, wherein the active voltage source device is arranged to be power supplied from the one of the transmission lines and comprises a first converter in series connection with the one of the transmission lines and a second converter in shunt connection with the one of the transmission lines, the method comprising the steps of:
   converting, by the second converter working as an inverter, DC power from the one of the transmission lines into AC power,
   supplying, by said second converter, the first converter with said AC power, and
   providing, by the first converter working as a rectifier, the DC voltage to be injected into the one of the transmission lines.

2. The method according to claim 1, wherein the voltage source device is controlled to inject a positive DC voltage in case a DC voltage level in the network falls below a lower DC voltage limit of the predefined voltage range.

3. The method according to claim 1, wherein the voltage source device is controlled to inject a negative voltage in case a DC voltage level in the network exceeds an upper DC voltage limit of the predefined voltage range.

4. The method according to claim 2, wherein the magnitude and sign of the DC voltage are determined in dependence on the DC voltage levels in the HVDC converter stations and on the DC current levels of the at least two transmission lines.

5. The method according to claim 4, wherein the magnitude and sign of the DC voltage are determined to not only maintain the DC voltage levels of the transmission lines within the predefined voltage range but also to balance the DC current distribution in a closed loop in the network.

6. The method according to claim 1, wherein the active voltage source device is power supplied from the one of the transmission lines.

7. The method according to claim 1, wherein the active voltage source device is power supplied from an external power source.

8. The method according to claim 1, wherein the DC voltage of the transmission lines is maintained to be within a predefined voltage range by controlling in a coordinated manner the active voltage source device and another active voltage source device, and the other active voltage source device is connected in series to another one of the transmission lines.

9. The method according to claim 1, wherein one terminal of the second converter is grounded.

10. A multi-terminal HVDC power transmission network comprising at least three HVDC converter stations interconnected by at least two transmission lines, wherein at least one of the transmission lines is a line having a length of approximately or more than 500 km, and an active voltage source device is connected in series to the one of the transmission lines and configured to maintain the DC voltage of the transmission lines of the network to be within a predefined voltage range by injecting a DC voltage in series with the one of the transmission lines and arranged to be power supplied from the one of the transmission lines, wherein the active voltage source device comprises a first converter in series connection with the one of the transmission lines and a second converter in shunt connection with the one of the transmission lines, the second converter works as an inverter to convert DC power from the one of the transmission lines into AC power to supply the first converter with said AC power, and the first converter works as a rectifier to provide the DC voltage to be injected into the one of the transmission lines.

11. The network according to claim 10, wherein the voltage source device injects a positive DC voltage in case a DC voltage level in the network falls below a lower DC voltage limit of the predefined voltage range.

12. The network according to claim 10, wherein the voltage source device injects a negative DC voltage in case a DC voltage level in the network exceeds an upper DC voltage limit of the predefined voltage range.

13. The network according to claim 11, further comprising a central control unit which compares at least one DC voltage level measured in the network with the predefined voltage range, and which, in case that the DC voltage level lies outside the voltage range, determines the magnitude and sign of the DC voltage depending on the DC voltage levels in the HVDC converter stations and on the DC current levels of the at least two transmission lines and transmits the magnitude and sign of the DC voltage to the voltage source device.

14. The network according to claim 13, wherein in case of a partly meshed or a fully meshed network, the central control unit determines the magnitude and sign of the DC voltage not only so that the voltage source device maintains the DC voltage levels of the transmission lines within the predefined voltage range but also so that it balances the DC current distribution in a closed loop in the network.

15. The network according to claim 10, wherein each of the HVDC converter stations has the same voltage rating.

16. The network according to claim 10, wherein the voltage source device takes its power from the one of the transmission lines or from an external power source.

17. The network according to claim 10, wherein the network is an unmeshed, a partly meshed or a fully meshed network.

18. The network according to claim 10, wherein another active voltage source device is connected to another one of the transmission lines, and the central control unit controls the two voltage source devices in a coordinated manner.

19. The network according to claim 10, wherein one terminal of the second converter is grounded.

20. An active voltage source device arranged to be connected in series with one of at least two transmission lines of a multi-terminal HVDC power transmission network, to maintain the DC voltage of the transmission lines in the network to be within a predefined voltage range by injecting a DC voltage in series with the one of the transmission lines and to be power supplied from the one of the transmission lines, wherein the active voltage source device comprises a first converter in series connection with the one of the transmission lines and a second converter in shunt connection with the one of the transmission lines, the second converter works as an inverter to convert DC power from the one of the transmission lines into AC power to supply the first converter with said AC power, and the first converter works as a rectifier to provide the DC voltage to be injected into the one of the transmission lines.

21. The voltage source device according to claim 20, wherein the voltage source device injects a positive DC voltage in case a DC voltage level in the network falls below a lower DC voltage limit of the predefined voltage range.

22. The voltage source device according to claim 21, wherein the voltage source device is connectable to a central control unit and is adapted to inject the DC voltage depending on the magnitude and sign of the DC voltage received from the central control unit.

23. The voltage source device according to claim 20, wherein the voltage source device injects a negative DC voltage in case a DC voltage level in the network exceeds an upper DC voltage limit of the predefined voltage range.

24. The voltage source device according to claim 20, wherein the device is arranged to be power supplied from an external power source.

25. The voltage source device according to claim 20, wherein the first converter is arranged to reverse the direction of its converter current.

26. The voltage source device according to claim 20, wherein one terminal of the second converter is grounded.

* * * * *